(12) United States Patent
Nall et al.

(10) Patent No.: US 7,877,629 B2
(45) Date of Patent: Jan. 25, 2011

(54) FACILITATING HANDLING OF EXCEPTIONS IN A PROGRAM IMPLEMENTING A M-ON-N THREADING MODEL

(75) Inventors: Jonathan Nicholas Nall, Austin, TX (US); Trevor Alan Robinson, Austin, TX (US)

(73) Assignee: Sanmina-SCI, San Jose, CA (US)

( * ) Notice: Subject to any disclaimer, the term of this patent is extended or adjusted under 35 U.S.C. 154(b) by 1577 days.

(21) Appl. No.: 11/142,227

(22) Filed: Jun. 1, 2005

(65) Prior Publication Data

US 2006/0277552 A1    Dec. 7, 2006

(51) Int. Cl.
*G06F 11/00* (2006.01)

(52) U.S. Cl. .................. 714/15; 712/228; 712/244; 718/108

(58) Field of Classification Search .............. 714/15; 712/244, 228; 718/108
See application file for complete search history.

(56) References Cited

U.S. PATENT DOCUMENTS

| | | | | |
|---|---|---|---|---|
| 5,197,138 A | * | 3/1993 | Hobbs et al. | 712/222 |
| 5,305,455 A | * | 4/1994 | Anschuetz et al. | 718/100 |
| 5,481,719 A | * | 1/1996 | Ackerman et al. | 718/108 |
| 5,515,538 A | * | 5/1996 | Kleiman | 710/260 |
| 5,784,613 A | * | 7/1998 | Tamirisa | 718/100 |
| 5,991,790 A | * | 11/1999 | Shah et al. | 718/100 |
| 6,651,163 B1 | * | 11/2003 | Kranich et al. | 712/244 |
| 6,675,191 B1 | * | 1/2004 | Ito | 718/102 |
| 6,766,515 B1 | * | 7/2004 | Bitar et al. | 718/100 |
| 6,904,517 B2 | * | 6/2005 | Nevill et al. | 712/228 |
| 7,020,879 B1 | * | 3/2006 | Nemirovsky et al. | 718/107 |

* cited by examiner

*Primary Examiner*—Yolanda L Wilson

(57) ABSTRACT

A method for facilitating handling of exceptions in object code transformed from a 1-to-1 threading model to a M-to-N threading model comprises transforming object code having a 1-to-1 threading model to a M-to-N threading model, saving context of a Runnable section of the object code into a context object in response to an exception occurring and rethrowing the exception after performing the saving. The transforming includes creating a Boolean enable value in a method context for an exception handler in the method context, mapping an exception type to the exception handler and wrapping a Runnable section of the object code within a respective synthetic exception handler. The respective synthetic exception handler is configured for saving context of the object code Runnable into a context object in response to an exception occurring and rethrowing the exception after performing the saving.

14 Claims, 3 Drawing Sheets

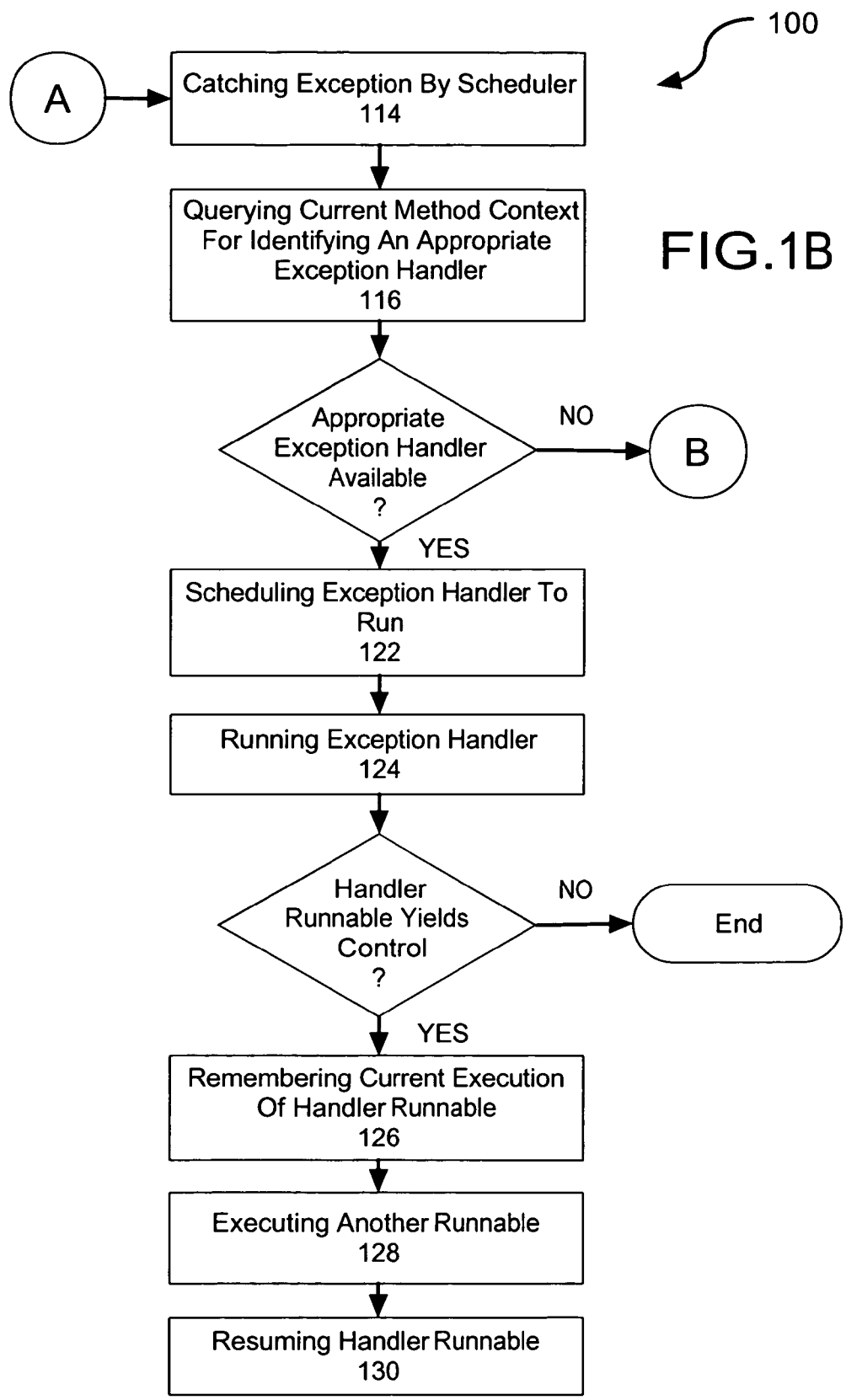

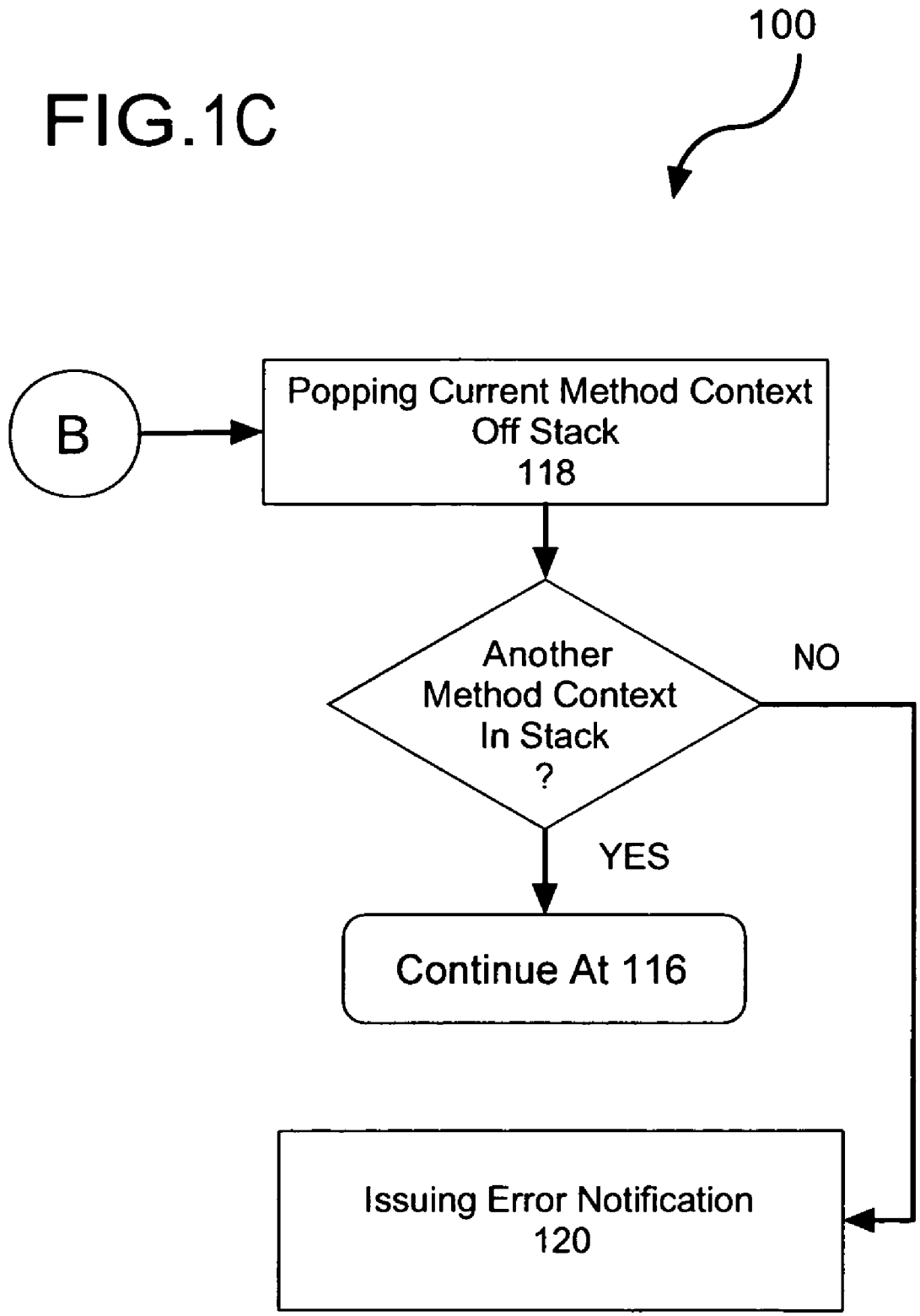

FACILITATING HANDLING OF EXCEPTIONS IN A PROGRAM IMPLEMENTING A M-ON-N THREADING MODEL

FIELD OF THE DISCLOSURE

The disclosures made herein relate generally to handling exceptions in data processing programs and, more particularly, to facilitating handling of exceptions in a program implementing a M-on-N threading model.

BACKGROUND

In multi-threaded applications, it is common to find that a given thread of execution of the application corresponds to exactly one thread in the operating system. This is termed a 1-to-1 threading model. For applications requiring hundreds or thousands of threads, the overhead of switching between these threads can hinder performance as too much time is spent performing context switches. Context switch refers to an entity scheduling threads (presumably an operating system) having decided to switch from a currently running thread to another thread, which involves saving a CPU state associated with the current thread and loading a previously saved CPU state of the thread to be run next. Examples of information comprised by the CPU state include, but are not limited to, register values and status flags.

A common solution to the problem of overhead associated with context switches is to map M program threads onto N operating system threads. This type of threading model is referred to as an M-to-N threading model. In a M-to-N threading model, each native operating system thread actually contains M threads of execution from an application's standpoint. M-to-1 is a specific case of M-to-N, where N=1. By mapping M program threads onto N operating system threads, the overhead associated with switching between operating system threads is advantageously reduced.

Because each program thread is mapped to exactly 1 operating system thread in a 1-to-1 threading model, any exception encountered by a particular operating system thread will be contained by that particular program thread. However, in an M-to-N threading model (i.e., N<M), M program threads are being run on N operating system threads. Thus, when an exception occurs in an operating system thread, care must be taken to contain the exception in the associated program thread in which it occurred without affecting other program threads sharing the operating system thread for that particular program thread. Conventional approaches for converting 1-to-1 threading models to M-to-N threading models do not address the issue of exception handling in a manner that limits adverse effect of an exception in a program thread in which it occurs without affecting other program threads sharing an operating system thread for that particular program thread.

Therefore, an approach for facilitating handling of exceptions in a manner that overcomes adverse considerations associated with exception handling in M-to-N threading models would be useful, advantageous and novel.

SUMMARY OF THE DISCLOSURE

Embodiments of the present invention add support for exception handling in a system implementing an M-to-N threading model. More specifically, in situations where object code is transformed from a 1-to-1 threading model to a M-to-N threading model, embodiments of the present invention address the issue of exception handling in a manner that limits adverse affect of an exception in a program thread in which it occurs. Handling of exceptions in accordance with the present invention precludes an exception from adversely affecting other program threads sharing an operating system thread for that particular program thread. Accordingly, the present invention advantageously overcomes one or more shortcomings associated with conventional approaches for handling exceptions in object code having a M-to-N threading model.

In one embodiment of the present invention, a method for facilitating handling of exceptions in object code having a M-to-N threading model comprises saving context of an object code Runnable into a context object in response to an exception occurring and rethrowing the exception after performing the saving. A "Runnable" in the context of the present invention refers to a basic block of object code. More specifically, a section of contiguous object code that may contain numerous exit points, but that contains exactly one entry point. An exit point, for example, would be one of a branch instruction, a method invocation and a blocking instruction (such as yielding control of the processor to another thread).

In another embodiment of the present invention, a method for transforming object code from a 1-to-1 threading model to a M-to-N threading model comprises creating a Boolean enable value in a method context for an exception handler in the method context, mapping exception types to exception handlers (i.e., including the exception handler in the method context) and wrapping a Runnable section of the object code within a respective synthetic exception handler. The respective synthetic exception handler is configured for saving context of the object code Runnable into a context object in response to an exception occurring and for rethrowing the exception after performing the saving.

In another embodiment of the present invention, a method for facilitating handling of exceptions in object code transformed from a 1-to-1 threading model to a M-to-N threading model comprises transforming object code having a 1-to-1 threading model to a M-to-N threading model, saving context of an object code Runnable into a context object in response to an exception occurring and rethrowing the exception after performing the saving. The transforming includes creating a Boolean enable value in a method context for an exception handler in the method context, mapping exception types to exception handlers and wrapping a Runnable section of the object code within a respective synthetic exception handler. The respective synthetic exception handler is configured for saving context of the object code Runnable into a context object in response to an exception occurring and for rethrowing the exception after performing the saving.

Turning now to specific aspects of the present invention, at least one method in accordance with the present invention includes running the object code Runnable after performing the rethrowing, catching the exception in response to performing the running and querying a current method context of a stack of method contexts for determining whether an appropriate exception handler for the exception is available.

In at least one embodiment of the present invention, a method includes scheduling the exception handler to run in response to determining that an appropriate exception handler is available in the current method context and includes popping the current method context off of the stack in response to determining that an appropriate exception handler is not available in the current method context and querying a next method context of the stack of method contexts for determining whether an appropriate exception handler for the exception is available in the next method context.

In at least one embodiment of the present invention, a method includes remembering that the exception is being handled in response to an appropriate exception handler being available and in response to a Runnable of the appropriate exception handler yielding control to another thread and includes resuming the Runnable of the appropriate exception handler after yielding control to the another thread.

In at least one embodiment of the present invention, transforming object code from a 1-to-1 threading model to a M-to-N threading model includes creating a Boolean enable value in a method context of the object code for an exception handler in the method context, mapping exception types to exception handlers and wrapping the Runnable section of the object code within a respective synthetic exception handler.

In at least one embodiment of the present invention, a synthetic exception handler is configured for saving context of an object code Runnable into a context object in response to an exception occurring and for rethrowing the exception after performing the saving.

In at least one embodiment of the present invention, the Boolean enable value designates whether the exception handler is active for a given section of code during method execution.

In at least one embodiment of the present invention, the Boolean enable value designates whether an exception handler of an appropriate type is enabled.

These and other objects, embodiments advantages and/or distinctions of the present invention will become readily apparent upon further review of the following specification and associated drawings.

BRIEF DESCRIPTION OF THE DRAWINGS

FIGS. 1A-1C depict an embodiment of a method for facilitating handling of exceptions in object code having a M-to-N threading in accordance with the present invention.

DETAILED DESCRIPTION OF THE DRAWING FIGURES

Figure 1A:
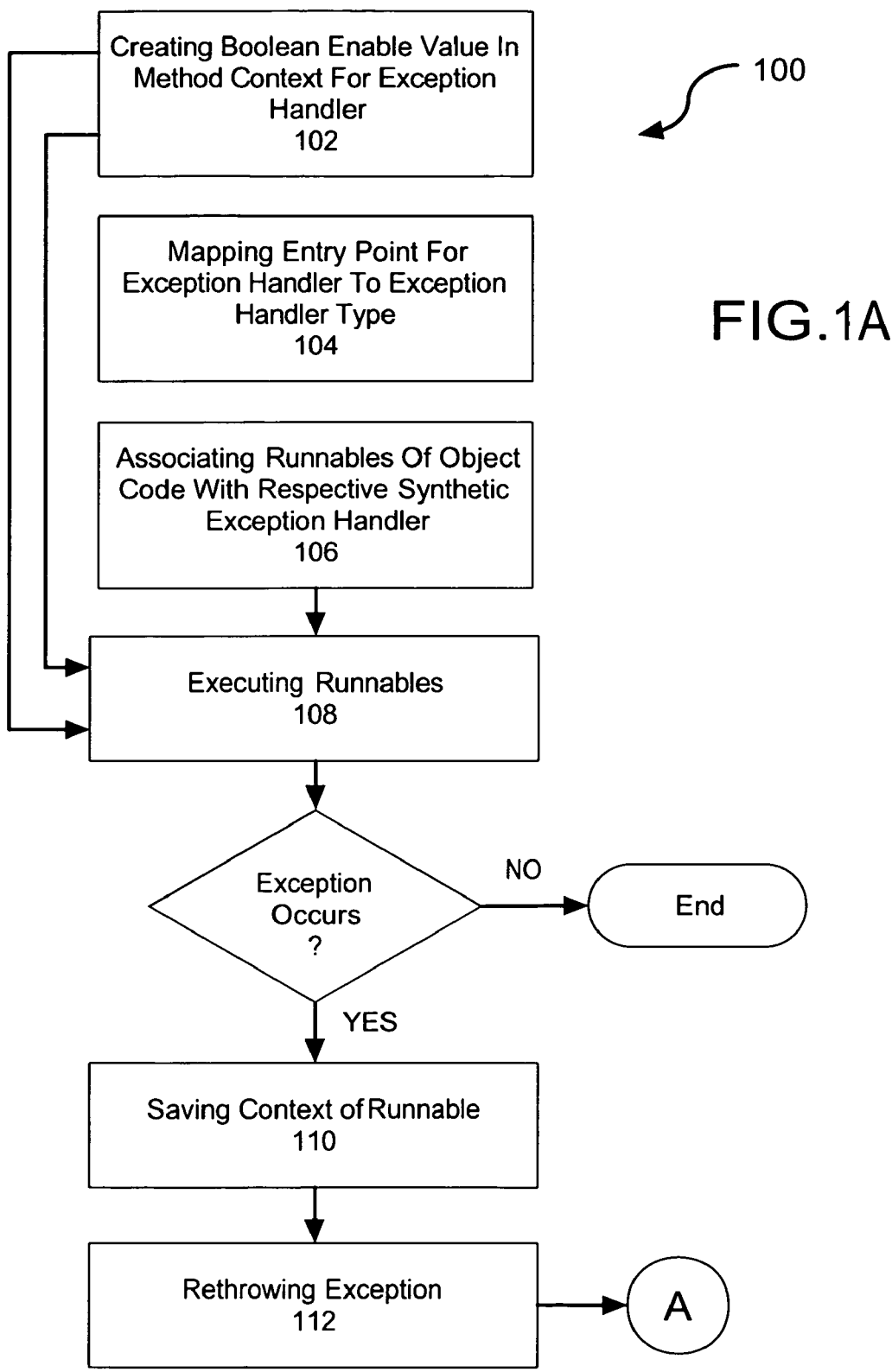

FIGS. 1A-1C depict a method for facilitating handling of exceptions in object code having a M-to-N threading model in accordance with the present invention (generally referred to as the method 100). The method 100 provides for exception handling of M-to-N object code in a manner that limits adverse affect of an exception in a program thread in which it occurs. Handling of exceptions in accordance with the present invention precludes an exception from adversely affecting other program threads sharing an operating system thread for that particular program thread. Accordingly, the method 100 advantageously overcomes one or more shortcomings associated with conventional approaches for handling exceptions in object code having a M-to-N threading model.

As depicted in FIG. 1A, the method 100 includes a plurality of operations that are performed during transformation of object code having a 1-to-1 threading model to a M-to-N threading model for enabling exception handling functionality in accordance with the present invention. An operation 102 is performed for creating a Boolean enable value in a method context for each exception handler of an object code method (i.e., in a context object associated with the object code method). Each instrumented method has a context object associated with it, which holds information (e.g., the Boolean value) about the exception handlers, local variable state, etc. An operation 104 is performed for mapping exception types to exception handlers (e.g., an entry point of each exception handler of the object code method). An operation 106 is performed for wrapping a Runnable of the object code method within a respective synthetic exception handler.

As depicted in the following example, the Boolean enable value allows a scheduler to know whether or not an exception enabler is enabled (i.e., whether or not there is an enabled exception handler for a particular type of exception). During execution of the object code method, the Boolean enable values are turned on and off as appropriate. Thus, via the Boolean enable value, a Runnable of the object code method may determine when an appropriate exception handler is available. Preferably, but not necessarily, an appropriate exception handler is an enabled exception handler that matches the type of thrown exception.

Example 1

Boolean Enable Value

```
public void method( )
{
    // no exception handler
    foo( );
    try
    {
        // in this try block, RuntimeExceptions will be caught
        bar( );
    }
    catch(RuntimeException e)
    {
        // code in this block is run if bar( ) throws a RuntimeException
        System.out.println("Exception: " + e);
    }
    // no exception handler
    baz( );
}
```

In the above code, a Boolean enable is used to determine whether the catch block should be run when a RuntimeException occurs. The handler is run when any code in the try block throws a RuntimeException. It is not run if foo( ) or baz( ) throws a RuntimeException. Thus, for a given exception type (i.e., RuntimeException in the example above), a Boolean value is provided for whether or not the given exception type is enabled at a given point in the method.

Turning now to a brief discussion on mapping of exception types to exception handlers, there are different exception types in a program language such as, for example, Java. In accordance with the present invention, an entry point for each one of the exception handlers is mapped to a respective exception type. Following is an example depicting such mapping.

Example 2

Mapping of Exception Types to Exception Handlers

FileNotFoundException, ClassNotFoundException and NullPointerException are three examples of exception types for Java object code. FileNotFoundException refers to an error having occurred because object code is attempting to open a file that does not exist. ClassNotFoundException refers to object code requesting a java class that does not exist. NullPointerException refers to object code attempting to access data or methods in a null reference.

The following code is an example of a mapping in accordance with the present invention.

```
public void method( )
{
    try
    {
        foo( );
    }
    catch(FileNotFoundException e)
    {
A:
    }
    catch(ClassNotFoundException e)
    {
B:
    }
}
```

In this example, if foo( ) throws a FileNotFoundException, there is an enabled exception handler of the appropriate type (i.e., FileNotFoundException) that should be run. The case is similar if foo( ) throws a ClassNotFoundException. However, if foo( ) throws a NullPointerException, there is no enabled handler of the appropriate type (i.e., NullPointerException).

The scheduler has a mapping of exception types to Runnables representing the entry points of their respective exception handlers. Accordingly, in the above example, if the scheduler catches a FileNotFoundException while executing the try block, it has a mapping to the Runnable representing the entry point of that exception handler (i.e., entry point A in the code above).

A synthetic exception handler is an exception handler that is introduced by a transformer that transforms object code having a 1-to-1 threading model to a M-to-N threading model. The term synthetic refers to fact that the exception handler does not exist in the original source code or pre-transformed object code. Further, the application writer is not aware of its existence. The purpose of the synthetic handler is to be the first handler to catch any exception that occurs while a Runnable is running. The synthetic handler performs the functions of saving context of the Runnable into a context object and rethrowing the exception.

Example 3

Synthetic Exception Handler

Referring to the following code, code in the exception handler and code in the try block exist in 2 different Runnables. However, the exception handler must have access to the most current values of local variables. Specifically, assuming that the variable 'a' has been assigned a value of 7 in the try block, the exception handler must see a value of 7 for the variable 'a'.

```
public void method( )
{
    int a = 5;
    try
    {
        a = 7;
        foo( );
    }
    catch(RuntimeException e)
    {
        System.out.println("a = " + a); // should print 7
    }
}
```

In order for this functionality to occur, the context of the Runnable representing the try block must be saved before the Runnable representing the exception handler is run. To this end, the method comprising the "real" handler is wrapped in a synthetic exception handler. In accordance with the present invention, an exception handler is created during transformation (i.e., the synthetic exception handler) that is configured for catching the RuntimeException before the "real" handler does and for explicitly saving the context. After catching the exception and saving the context, the synthetic exception handler rethrows the exception so that the "real" handler will catch the exception.

The source of the transformed object code, which includes the synthetic exception handler, appears as follows.

```
public void method( )
{
    int a = 5;
    try
    {
        try
        {
            a = 7;
            foo( );
        }
        catch(RuntimeException eSynthetic) // synthetic exception handler
        {
            // put code to save the context
            // (e.g. the value of local variable a) here
            // and re-throw so the "real" handler will run
            throw eSynthetic;
        }
    }
    catch(RuntimeException e)
    {
        System.out.println("a = " + a); // should print 7
    }
```

Referring back to FIG. 1A, an operation 108 is performed for executing Runnables of the transformed object code. In the case where the Runnables execute without an exception occurring, the Runnables execute to their completion and the method 100 ends. In the case where a Runnable has an exception occurs, a synthetic handler associated with the Runnable performs an operation 110 for saving context of the Runnable and an operation 112 for rethrowing the exception.

When a thread of execution detects an exceptional condition, it throws an exception. An example of an exceptional condition includes detecting a null pointer or trying to assign a value of type A to a variable of type B, where A and B are incompatible types. Languages that support throwing exceptions include, but are not limited to, C++ and Java. In such languages, try/catch/finally syntax is generally employed to give a programmer control over the flow of execution because some exceptions may be acceptable.

Example 4

Rethrowing Exception

In accordance with the present invention, an exception is rethrown if the handler for the exception rethrows it. Following is an example of object code that performs rethrowing of an exception. In the example, the exception handler prints any text associated with the exception and then rethrows the exception.

```
public void method( )
{
  try
  {
    foo( );
  }
  catch(RuntimeException e)
  {
    System.out.println("Exception: " + e);
    throw e; // rethrow the caught exception
  }
}
```

After the synthetic exception handler performs the operation 112 for rethrowing the exception, the Runnable is executed by the Scheduler, which performs an operation 114 for catching the exception (FIG. 1B). Accordingly, a skilled person will appreciate that the exception is rethrown for the specific purpose of enabling the Scheduler to catch the exception and act on the exception appropriately.

In response to the Scheduler catching the exception, the Scheduler performs an operation 116 for querying the current Method context for identifying an appropriate exception handler for the exception. An appropriate exception handler refers to an exception handler that matches a type of the exception and that is enabled. When an appropriate exception handler is not available in the current Method context, the Scheduler performs an operation 118 for popping the current Method context off a stack of a plurality of Method contexts (FIG. 1C). When the stack includes another Method context (i.e., the next Method context), the method 100 continues at the operation 116 where querying is performed for identifying an appropriate exception handler for the exception. When an appropriate exception handler is not available in the next Method context, the method 100 proceeds back to the operation 118 to provide another Method context to query. If all available Method contexts in the stack are depleted prior to an appropriate exception handler being identified, an operation 120 is performed for issuing an error notification. More specifically, the method ends with an error notification when the stack of method contexts is exhausted without locating an appropriate exception handler.

In response to an appropriate exception handler being identified in a particular Method context (i.e., the current Method context at the operation 116), the methods 100 proceeds at an operation 122 for scheduling a Runnable of the appropriate exception handler to run, followed by an operation 124 being performed for running the Runnable of the appropriate exception handler. When the Runnable for the appropriate exception handler yields control of a processor running the Runnable of the appropriate exception handler to another thread, an operation 126 is performed by the Scheduler for remembering a current state of the execution of the Runnable of the appropriate exception handler, followed by the Scheduler performing an operation 128 for executing the other thread. After executing at least a portion of the other thread, the Scheduler performs an operation 130 for resuming the Runnable of the appropriate exception handler. Otherwise, where the Runnable for the appropriate exception handler does not yields control of a processor running the Runnable of the appropriate exception handler to another thread, the Scheduler runs the Runnable of the appropriate exception handler to its completion (i.e., end of the appropriate exception handler). Execution of the code immediately following the exception handler then continues as normal.

The description and examples above are presented in a manner that is specific to Java programming language. However, a skilled person will appreciate that exception-handling functionality in accordance with the present invention (e.g., as embodied by the method 100) is applicable and useful to other programming languages besides Java that support exceptions.

When coupled with a thread transformer configured for transforming object code having a 1-to-1 threading model to a M-to-N threading model, exception handling functionality in accordance with the present invention provides for exception support in the multithreaded code being transformed. As will be appreciated by the skilled person, a transformer configured for transforming object code having a 1-to-1 threading model to a M-to-N threading model is incomplete if it does not have a means for handling at least a portion of exceptions that may occur during transformation of object code.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice embodiments of the inventive disclosures made herein. It is to be understood that other appropriate embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating handling of exceptions in object code having a M-to-N threading model, comprising: creating a Boolean enable value in a method context of said object code for an exception handler in the method context, wherein the Boolean enable value designates whether an exception handler of an appropriate type is enabled; mapping an exception type to the exception handler, wherein the object code Runnable uses the Boolean enable value to determine whether the exception handler is an appropriate exception handler, and wherein an appropriate exception handler is an available exception handler that matches the exception type; saving context of an object code Runnable into a context object in response to an exception occurring; and rethrowing the exception after performing said saving.

2. The method of claim 1, further comprising:
running the object code Runnable after performing said rethrowing;
catching the exception in response to performing said running; and querying a current method context of a stack of method contexts for determining whether an appropriate exception handler for the exception is available.

3. The method of claim 2, further comprising:
scheduling the exception handler to run in response to determining that appropriate exception handler is available in the current method context; and
popping the current method context off of the stack in response to determining that the appropriate exception handler is not available in the current method context and querying a next method context of the stack of method contexts for determining whether the appropriate exception handler for the exception is available in the next method context.

4. The method of claim 3, further comprising:
remembering that the exception is being handled in response to an appropriate exception handler being available and in response to a Runnable of the appropriate exception handler yielding control to another thread; and
resuming the Runnable of the appropriate exception handler after yielding control to said another thread.

5. The method of claim 1, further comprising:
wrapping the Runnable section of said object code within a respective synthetic exception handler, wherein the respective synthetic exception handler is configured for performing said saving and said rethrowing.

6. The method of claim 5, further comprising:
running the object code Runnable after performing said rethrowing;
catching the exception in response to performing said running; and
querying a current method context of a stack of method contexts for determining whether the appropriate exception handler for the exception is available.

7. The method of claim 6, further comprising:
scheduling the exception handler to run in response to determining that the appropriate exception handler is available in the current method context; and
popping the current method context off of the stack in response to determining that the appropriate exception handler is not available in the current method context and querying a next method context of the stack of method contexts for determining whether the appropriate exception handler for the exception is available in the next method context.

8. The method of claim 7, further comprising:
remembering that the exception is being handled in response to the appropriate exception handler being available and in response to a Runnable of the appropriate exception handler yielding control to another thread; and
resuming the Runnable of the appropriate exception handler after yielding control to said another thread.

9. A method for transforming object code from a 1-to-1 threading model to a M-to-N threading model, comprising:
creating a Boolean enable value in a method context for an exception handler in the method context, wherein the Boolean enable value designates whether an exception handler of an appropriate type is enabled in the current method context;
mapping an exception type to the exception handler, wherein the object code Runnable uses the Boolean enable value to determine whether the exception handler is an appropriate exception handler, and wherein an appropriate exception handler is an available exception handler that matches the exception type;
mapping an entry point for the exception handler to the exception type and
wrapping a Runnable section of said object code within a respective synthetic exception handler, wherein the respective synthetic exception handler is configured for saving context of the object code Runnable into a context object in response to an exception occurring and for rethrowing the exception after performing said saving.

10. A method for facilitating handling exceptions in object code transformed from a 1-to-1 threading model to a M-to-N threading model, comprising:
transforming object code having a 1-to-1 threading model to a M-to-N threading model, wherein said transforming includes creating a Boolean enable value in a method context for an exception handler in the method context, mapping an exception type to the exception handler and wrapping a Runnable section of said object code within a respective synthetic exception handler, wherein the Boolean enable value designates whether an exception handler of an appropriate type is enabled wherein an appropriate exception handler is an available exception handler that matches the exception type, and wherein the respective synthetic exception handler is configured for saving context of the object code Runnable into a context object in response to an exception occurring and for rethrowing the exception after performing said saving;
saving context of a object code Runnable into a context object in response to an exception occurring; and
rethrowing the exception after performing said saving.

11. The method of claim 10, further comprising mapping an entry point for the exception handler to the exception type.

12. The method of claim 10, further comprising:
running the object code Runnable after performing said rethrowing;
catching the exception in response to performing said running; and
querying a current method context of a stack of method contexts for determining whether the appropriate exception handler for the exception is available.

13. The method of claim 12, further comprising:
scheduling the exception handler to run in response to determining that the appropriate exception handler is available in the current method context; and
popping the current method context off of the stack in response to determining that the appropriate exception handler is not available in the current method context and querying a next method context of the stack of method contexts for determining whether the appropriate exception handler for the exception is available in the next method context.

14. The method of claim 13, further comprising:
remembering that the exception is being handled in response to the appropriate exception handler being available and in response to a Runnable of the appropriate exception handler yielding control to another thread; and
resuming the Runnable of the appropriate exception handler after yielding control to said another thread.

* * * * *